United States Patent
Luciano et al.

(10) Patent No.: US 6,899,626 B1
(45) Date of Patent: *May 31, 2005

(54) APPARATUS AND METHOD FOR DISPENSING PRIZES

(75) Inventors: Robert A. Luciano, Reno, NV (US); Robert W. Crowder, Las Vegas, NV (US); Michael Souza, Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 49 days.

This patent is subject to a terminal disclaimer.

(21) Appl. No.: 10/600,244

(22) Filed: Jun. 20, 2003

Related U.S. Application Data

(63) Continuation of application No. 09/769,168, filed on Jan. 24, 2001, now Pat. No. 6,843,720, which is a continuation-in-part of application No. 09/660,823, filed on Sep. 13, 2000, now Pat. No. 6,609,969.
(60) Provisional application No. 60/153,765, filed on Sep. 13, 1999.

(51) Int. Cl.[7] .............................. A63F 9/24; A07F 1/04; G07F 11/00
(52) U.S. Cl. ........................ 463/25; 463/46; 221/154
(58) Field of Search ............................. 463/16–20, 25, 463/26, 27, 28; 273/138.1, 138.2, 139, 143 R, 448; 221/2, 6–8, 131, 154–155

(56) References Cited

U.S. PATENT DOCUMENTS

| | | | |
|---|---|---|---|
| 988,570 A | | 4/1911 | Hassmann |
| 1,942,718 A | * | 1/1934 | Meyer .......................... 194/251 |
| 4,454,670 A | * | 6/1984 | Bachmann et al. ............ 40/584 |
| 4,869,500 A | * | 9/1989 | Williams ........................ 463/2 |
| 5,120,060 A | | 6/1992 | Parker et al. |
| 5,207,784 A | * | 5/1993 | Schwartzendruber .......... 221/6 |
| 5,290,033 A | | 3/1994 | Bittner et al. |
| 5,310,184 A | | 5/1994 | Grist |
| 5,344,199 A | | 9/1994 | Carstens et al. |
| 5,397,125 A | | 3/1995 | Adams |
| 5,397,134 A | | 3/1995 | Fishman et al. |

(Continued)

OTHER PUBLICATIONS

Fey, Marshall, Slot Machines—A Pictorial History of 100 years, 1997, 5th, pp. 4–5, and 8.

*Primary Examiner*—Mark Sager
(74) *Attorney, Agent, or Firm*—Brown Raysman Millstein Felder & Steiner LLP

(57) ABSTRACT

A device for dispensing prizes includes a housing having a plurality of compartments, a door attached to the housing for coving the compartments, and a lock for limiting access to the compartments. The contents of the compartments are visible from the outside. Each compartment contains a prize, such as a diamond. The housing may be part of, or linked to, a gaming device. When a player wins a game, which entitles the player to select a tangible award, the device signals this fact to the player. The player then selects a compartment by pressing an input device located on the housing. An attendant opens an external door, and inserts an electronic key into a receptacle associated with the selected compartment, and enters a required code into the key. The compartment then opens, and the player obtains the prize. The device may also include an inventory control system which preferably uses an RFID apparatus for monitoring the contents of each compartment, and for keeping records of an inventory of prizes.

53 Claims, 13 Drawing Sheets

U.S. PATENT DOCUMENTS

| | | | |
|---|---|---|---|
| 5,402,911 A | 4/1995 | Noell | |
| 5,551,692 A | 9/1996 | Pettit et al. | |
| 5,629,981 A | 5/1997 | Nerlikar | |
| 5,816,918 A | 10/1998 | Kelly et al. | |
| 5,819,981 A | 10/1998 | Cox | |
| 5,844,808 A * | 12/1998 | Konsmo et al. | 700/244 |
| 5,848,935 A | 12/1998 | Noell et al. | |
| 6,007,426 A * | 12/1999 | Kelly et al. | 463/16 |
| 6,015,344 A | 1/2000 | Kelly et al. | |
| 6,089,978 A | 7/2000 | Adams | |
| 6,110,042 A | 8/2000 | Walker et al. | |
| 6,131,399 A * | 10/2000 | Hall | 62/127 |
| 6,152,447 A | 11/2000 | Stanley | |
| 6,204,763 B1 | 3/2001 | Sone | |
| 6,220,516 B1 * | 4/2001 | Tuttle et al. | 235/492 |
| 6,325,294 B2 | 12/2001 | Tuttle et al. | |

* cited by examiner

APPARATUS AND METHOD FOR DISPENSING PRIZES

CROSS REFERENCES TO RELATED APPLICATIONS

This application is a continuation of U.S. patent application Ser. No. 09/769,168, filed Jan. 24, 2001 now U.S Pat. No. 6,843,720, which is a continuation-in-part of U.S. patent application Ser. No. 09/660,823, filed on Sep. 13, 2000 now U.S. Pat. No. 6,609,969, which claims priority of U.S. provisional patent application No. 60/153,765, filed on Sep. 13, 1999. The disclosure of these applications are hereby expressly incorporated by reference.

BACKGROUND OF THE INVENTION

1. Field of Invention

The present invention relates to the field of gaming, and provides a method and apparatus for dispensing prizes.

2. Description of Related Art

There are many kinds of gaming devices in current use. Such machines include slot machines, either mechanical or electronic, video poker machines, arcade games, and many other kinds of mechanical, electrical, and electronic machines, which enable players to play games. In all cases, these machines provide prizes in only limited ways. It is, of course, possible for a machine to dispense a prize of coins directly to the player, as is commonly done in the case of slot machines and the like. Other electronic gaming machines include built-in printers that provide a winning player with a voucher, which can be redeemed for money at a cashier's window. In all of these cases, the prize is in the form of money, not some other tangible item of value. Depending on the design of the gaming machine, the player may see a display of a dollar amount that can be won with the machine. But for gaming machines of the prior art, the awarding of non-monetary prizes has not been considered feasible due to requirements of security and inventory control.

U.S. Pat. No. 5,397,125 issued to Adams discloses a gaming device with payouts in multiple forms. One form of payout comprises a national currency, such as U.S. quarters, while another form of payout comprises tokens formed of a precious metal, such as silver and/or gold. The device disclosed in this patent displays tokens to players. However, the tokens displayed to the player are merely representative of the tokens the player may receive when the player achieves the appropriate award. A player is not allowed to see the actual prize that is to be awarded to the player and no means is provided for allowing the player to select the prize that is to be awarded to the player from among a plurality of prizes. The enjoyment and excitement of winning a prize is greatly increased when players can select the actual award the player will receive. This is especially true when the prizes are unique or subject to personal taste, such as jewelry.

The entertainment value of some games may be substantially enhanced when the player has the opportunity to view the actual award that can be won. Moreover, some kinds of valuable tangible prizes occupy very little space, such as diamonds, jewelry, watches, tickets to popular sporting events, keys to an automobile, and others. However, placing prizes of this kind in a display case is problematic, because of the need for security. In order to display prizes of this kind continuously to players, a mechanism must be provided that assures neither players nor gaming personnel will be able to gain access to such prizes without proper authorization.

Also, it is important to have a mechanism for automatically monitoring inventory of prizes, both for purposes of maintaining security of the prizes, and to be sure that the gaming machine is properly stocked at all times.

The present invention provides a method and apparatus that makes it feasible to display and dispense actual, non-monetary prizes that can be won at a gaming machine. The invention provides multiple levels of security that greatly reduce the chance of theft by players or by employees of the gaming establishment.

SUMMARY OF THE INVENTION

The present invention comprises a system for awarding prizes. The system comprises at least one gaming device, at least one prize, and at least one vault. The gaming device being adapted to allow a player to play a game and produce a predetermined prize-qualifying event. The vault is adapted to store and display the prize and dispense the prize after the predetermined prize qualifying event occurs. The vault comprises a housing, a compartment in the housing, and a lock. The compartment is adapted to hold the prize and the lock is adapted to limit removal of the prize from the compartment. The player may directly view the actual prize that may be awarded to the player when the prize qualifying event occurs.

Advantages of the Present Invention

One of the advantages of the present invention is that it provides a gaming device that displays one or more tangible prizes or symbols of prizes.

A further advantage of the present invention is that it provides a gaming device that allows players to select the actual prize that will be awarded to the player.

Another advantage of the present invention is that it provides a system that securely stores physical prizes.

An additional advantage of the present invention is that it utilizes an apparatus that enhances the entertainment value of a gaming device, by making it feasible to display and dispense tangible prizes to winners of games.

Another advantage of the present invention is that it provides a device for storing and dispensing of tangible prizes or symbols of prizes, wherein the device has an automated means for monitoring an inventory of prizes.

A further advantage of the present invention is that it provides a device for automatically dispensing prizes.

Another advantage of the present invention is that it provides a system for allowing players of different gaming devices to view, select, and receive prizes from a display device that displays a plurality of prizes.

Yet a further advantage of the present invention is that it provides methods and devices for monitoring prizes and tracking prize inventory.

The reader skilled in the art will recognize other objects and advantages of the present invention, from a reading of the following brief description of the drawings, the detailed description of the invention, and the appended claims.

DETAILED DESCRIPTION OF THE PREFERRED EMBODIMENT

Vault

The present invention includes a vault, generally indicated by reference number 1, that is adapted to store, display, and dispense tangible prizes to players of various gaming devices. The vault of the present invention may be adapted to sit on top of a gaming machine, to be formed integrally with a gaming machine, or to be linked to one or more gaming machines via a communication device. FIGS. 1–4 illustrate one embodiment of the vault of the present invention, and FIG. 5 shows a typical gaming device equipped with such a vault.

Figure 1:
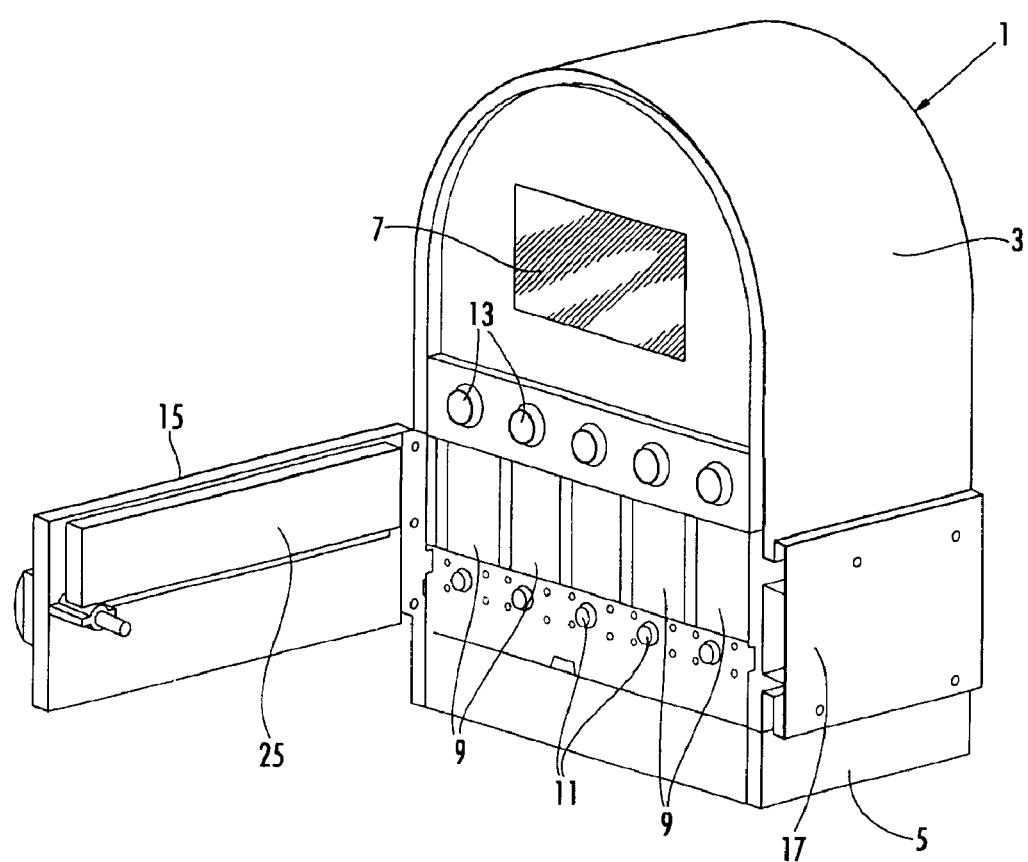
FIG. 1 is substantially a perspective view of the dispensing device of the present invention, showing its door opened.

As shown in FIG. 1, vault 1 includes a housing 14 having a curved top portion 3, and a generally flat bottom portion 5 enabling the vault to be mounted on a conventional gaming device. It is recognized, however, that other shapes may also be used. For example, top portion 3 may be flat to allow a plurality of vaults to be stacked on top of each other.

Compartments 9 are used to hold tangible or symbolic prizes. Each compartment 9 may comprise a lock 11 for limiting access to the compartment and limiting removal of the prize stored therein. Lock 11 may comprise a locking plate 10, which projects into compartment 9 and prevents removal of the prize. Lock 11 may comprise an electronically enabled lock controlled by CPU or controller 53 (see FIG. 6) or other well known mechanical locks.

Compartments 9 are normally further enclosed by door 15, which may be locked by locking mechanism 17. Door 15 further limits access to the contents of the compartments. Locking mechanism 17 may include a mechanical lock actuated by a key and it may also include an electrically activated mechanism. Locking mechanisms 17 may also use a variety of security devices, such as a radio frequency identification (RFID) system that shall be discussed more fully below, to enable the mechanism. If the RFID system is used, an attendant may present an RFID badge that is interrogated by an RFID sensor 18 to verify the security permissions of the attendant and allow the attendant to open locking mechanism 17.

Door sensor 57 may also be provided to signal when door 15 has been opened. Door sensor 57 is any device that can monitor the status of the external door and generate a signal that door 15 is open or closed, such as a mechanical switch or a proximity sensor.

Door 15 may comprise a transparent partition or window 25 that may be made from a variety of materials, such as of hard plastic or glass. The partition permits the contents of the compartment to be viewed from the outside, but limits access to the compartment.

Vault 1 may include a display device 7 for display of indicia relating to the game or other game related information. An input device 13 may be associated with each compartment. Input device 13 may be a pushbutton, which a player can actuate to indicate his or her choice of award. Alternatively, input device 13 may comprise a touch screen, such as display device 7. In this embodiment, a single touch screen may be adapted to allow players to indicate selection of any of the compartments. Many other input devices 13 may be used with the present invention.

Figure 2:
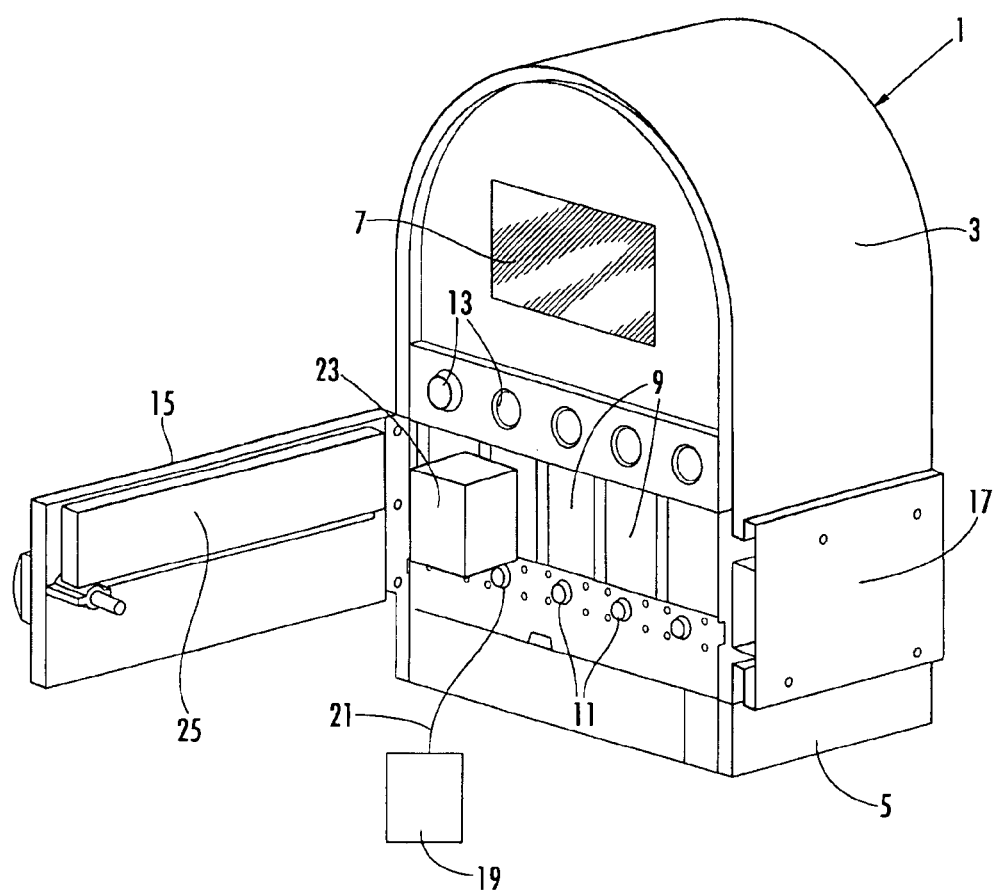
FIG. 2 is substantially a perspective view similar to FIG. 1, showing a container containing a prize coming out of a compartment of the dispensing device.

FIG. 2 shows the vault of the present invention, in a view similar to that of FIG. 1, except that FIG. 2 also shows a container 23 extending out of one of the compartments 9. Container 23 is adapted to hold a tangible or symbolic award, which will be described later, and it is at least partially transparent to allow players to view the prize held therein. FIG. 2 also shows, an alternative embodiment in block form in which electronic key 19, such as a Medeco electronic lock and key system, is shown to be temporarily connected by cable 21 to lock 11.

Figure 3:
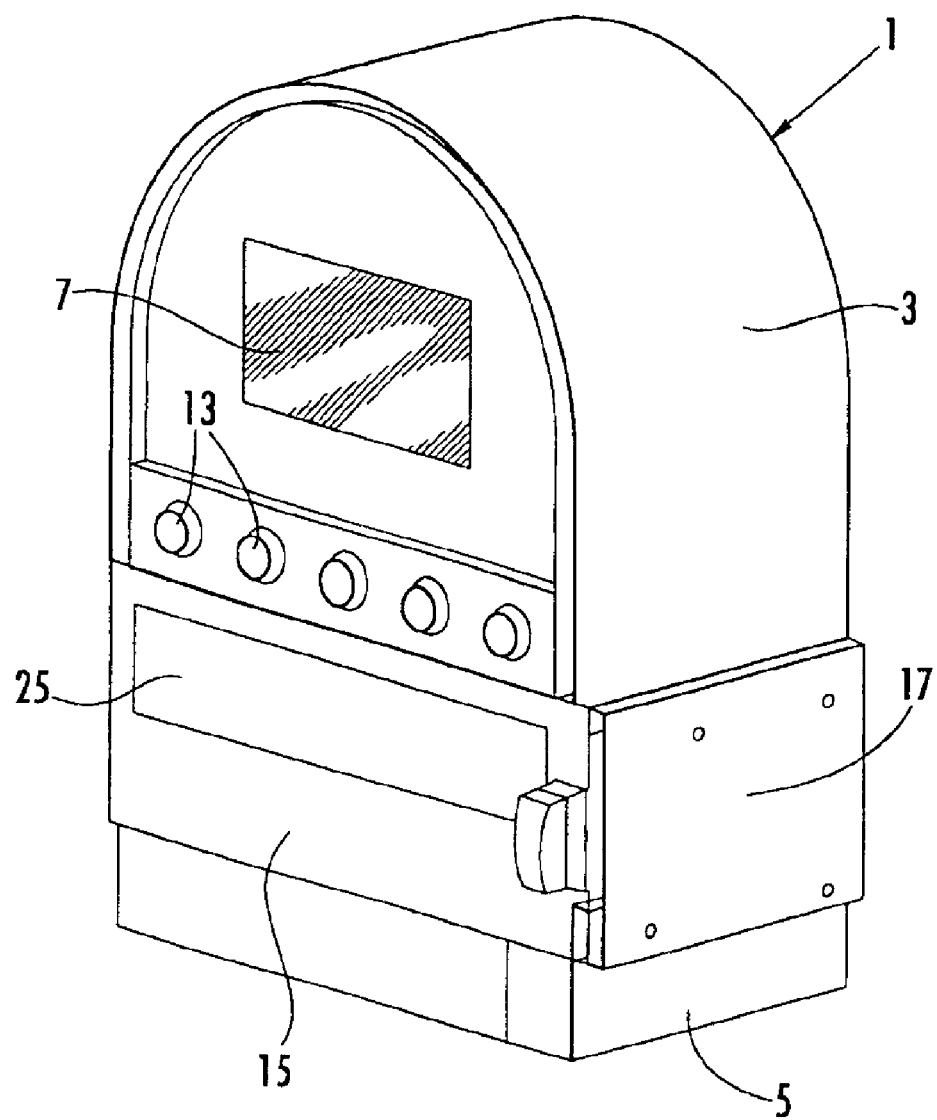
FIG. 3 is substantially a perspective view, similar to FIGS. 1 and 2, showing the dispensing device with its door closed.

FIG. 3 is substantially a perspective view, similar to those of FIGS. 1 and 2, but showing the door 15 in the closed and locked position.

Figure 4:
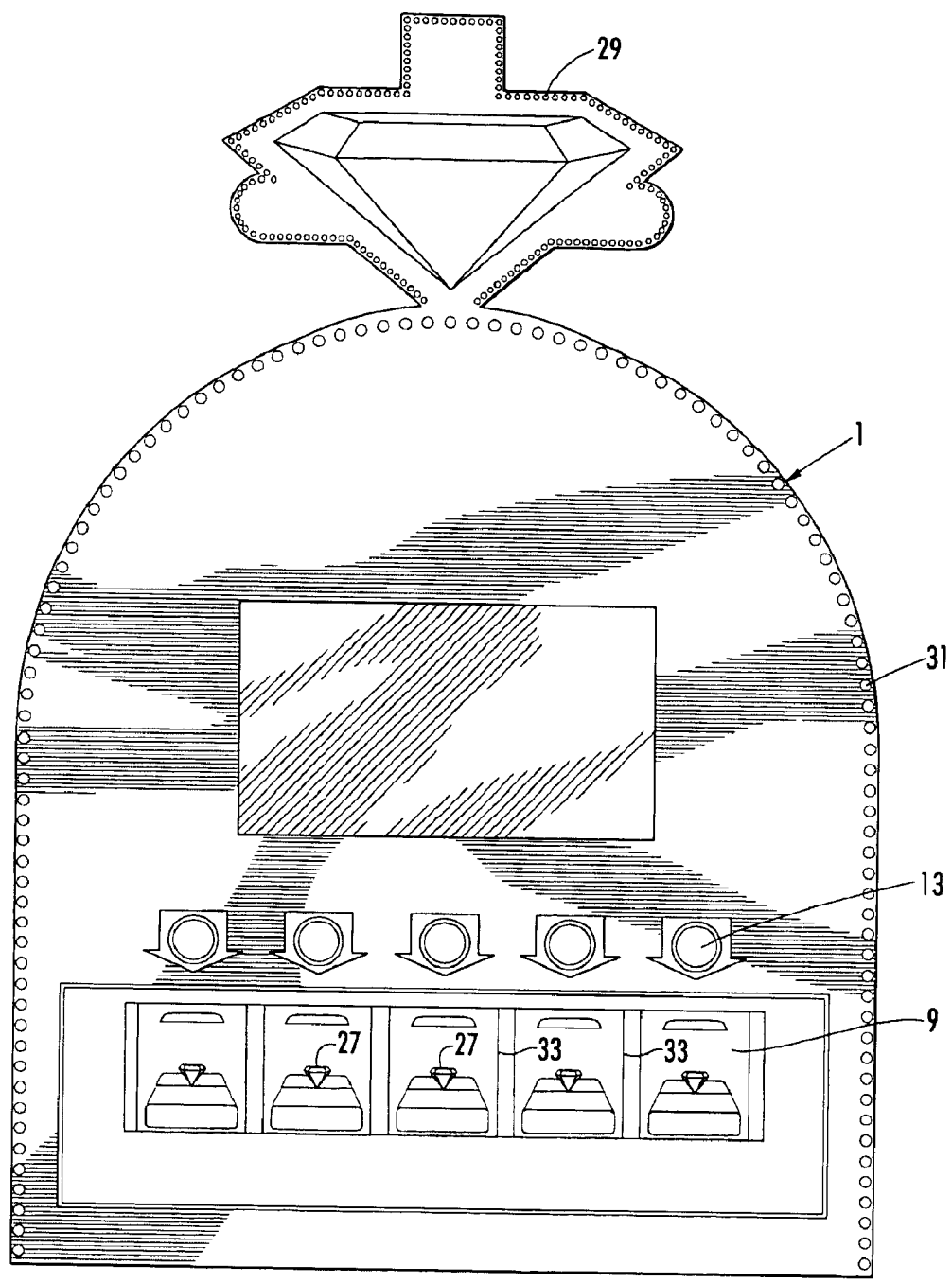
FIG. 4 is substantially a front elevational view of one embodiment of the dispensing device of the present invention.
Figure 5:
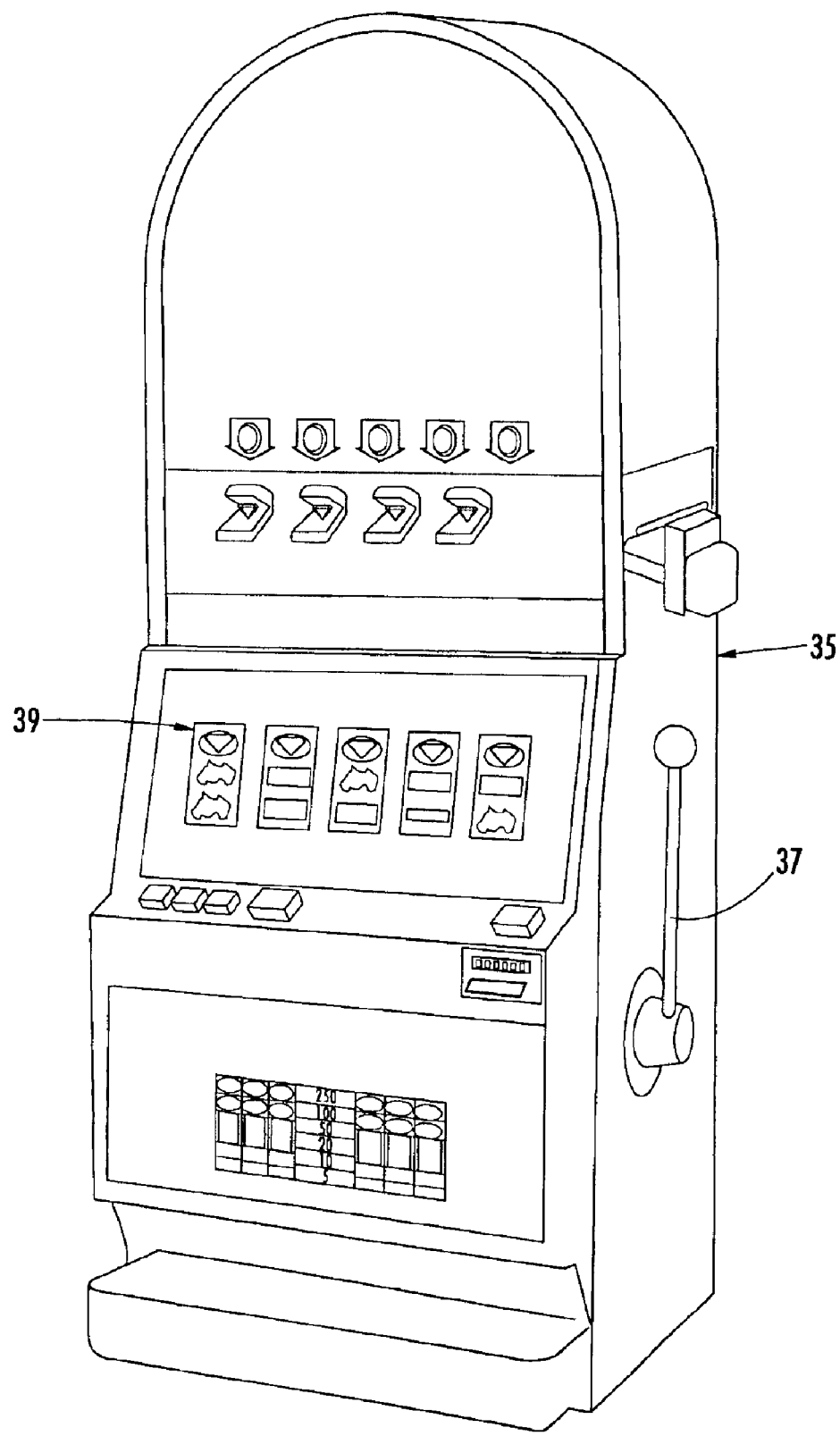
FIG. 5 is substantially a perspective view of a gaming machine equipped with the dispensing device of the present invention.

FIG. 4 is substantially a front elevational view of one preferred embodiment of vault 1 of the present invention. As shown in FIG. 4, the vault includes a plurality of compartments 9, each of which holds a prize 27. In this embodiment, each prize 27 comprises a gemstone. Gemstones and jewelry are particularly well adapted for use with the present invention because they are small, valuable, unique, and attractive. Each gem is mounted in a suitable case, such as a jewelry box, and the entire case is held within container 23. Each container 23 is in turn held within a compartment 9.

In the more general case, the prizes need not be diamonds, but can be any prizes that can be conveniently stored and displayed in compartments. Examples of other kinds of prizes include rings, watches, other pieces of jewelry, rare coins or stamps, or tickets to entertainment events or other services. Still other prizes could include tangible symbolic prizes that represent a prize that is not present. For example, symbolic prizes may include keys to an automobile or an image of a good or service. All such prizes are intended to be included within the scope of the present invention.

In some cases, it may be desirable for the player to redeem the prize at another location. The redemption location may be a dedicated area, such as a redemption booth, in the gaming establishment or a merchant that deals in the kind of good or service that is being awarded. For example, if the player selects a key to a car, the player may actually obtain possession of the car at a car dealership. If the player selected a diamond ring, the player may be given a symbolic equivalent and the player would pick up the diamond ring at a jewelry store so the ring can be properly fit to the person. This method of redemption has the advantage of simplifying the redemption process because the game operator need not duplicate the specialized knowledge and services provided by merchants of the good or service. Furthermore, the game operator need not have a large inventory of prizes.

In the embodiment disclosed in FIG. 4, each compartment 9 includes a transparent partition 33. Partition 33 allows light to pass from one compartment to another, thereby aiding viewing of the prizes 27. The compartments are further secured by an external door 15, of the type shown in FIGS. 1–3, and having its own transparent window 25, which allows observation of all of prizes 27.

At the top of the vault is a light 29 that is adapted to signal an attendant that a player has qualified to select a prize from vault 1. In the example of FIG. 4, light 29 includes a representation of a diamond, because diamonds are the prizes held in the compartments, and diamonds constitute the "theme" of this particular machine. Light 29 may take other forms within the scope of the invention.

Light 29 may include various combinations of lights, including one or more lights within the representation of the diamond, and perimeter lights surrounding the diamond. Also, there are perimeter lights 31 disposed around the main body of vault 1 itself. These lights can be programmed to flash during normal play, and/or when a player has won a major award. The pattern of flashing can be made to vary to suit the situation. For example, the pattern of lights could be programmed to flash more rapidly when the player has just won a prize.

In the preferred embodiments described above, there are at least three levels of security, namely the external door lock, the input devices operated by the player upon winning a game, and the electronic keys into which an attendant enters a necessary code. However, some of these levels could be omitted, if it is desired to simplify the system and/or to reduce its cost. For example, one would provide a vault in which the only conditions needed to open a compartment are that the player wins a game and that the player selects a particular input device. In another example, one could provide a vault the includes the entire above, plus the requirement of the use of the electronic key. The latter system would therefore omit the external door. These alternatives are not as secure as the preferred embodiment, but should nevertheless be considered within the scope of the present invention.

The number of compartments can also be varied. It is possible to provide a device with only one compartment, containing only one award at one time. The latter arrangement might be used if it desired to award an extremely special prize.

Gaming Device

FIG. 5 shows one of the embodiments of vault 1 of the present invention used in conjunction with a gaming device 35. Gaming device 35 may include a display device 39, such as spinning reels or a video display device, and input devices 36, such as buttons or a touch screen. In this example also, the prizes stored in compartments 9 of the vault are diamonds.

In FIG. 5, vault 1 is an integral part of the overall gaming device. As will be discussed below, it is also possible to form the vault separately, and to attach it to the gaming machine, or to operate the vault remotely from the gaming machine. The latter alternatives are within the scope of the present invention.

Note also that in the embodiment illustrated in FIG. 5, all compartments contain the same type of award. In a more general case, it is not necessary that the prizes in each compartment be the same. Providing a mixed selection of prizes can enhance the entertainment value of the game, and can also enable the system to cater to the desires of a larger percentage of the gaming public.

Central Processor Unit

Figure 6:
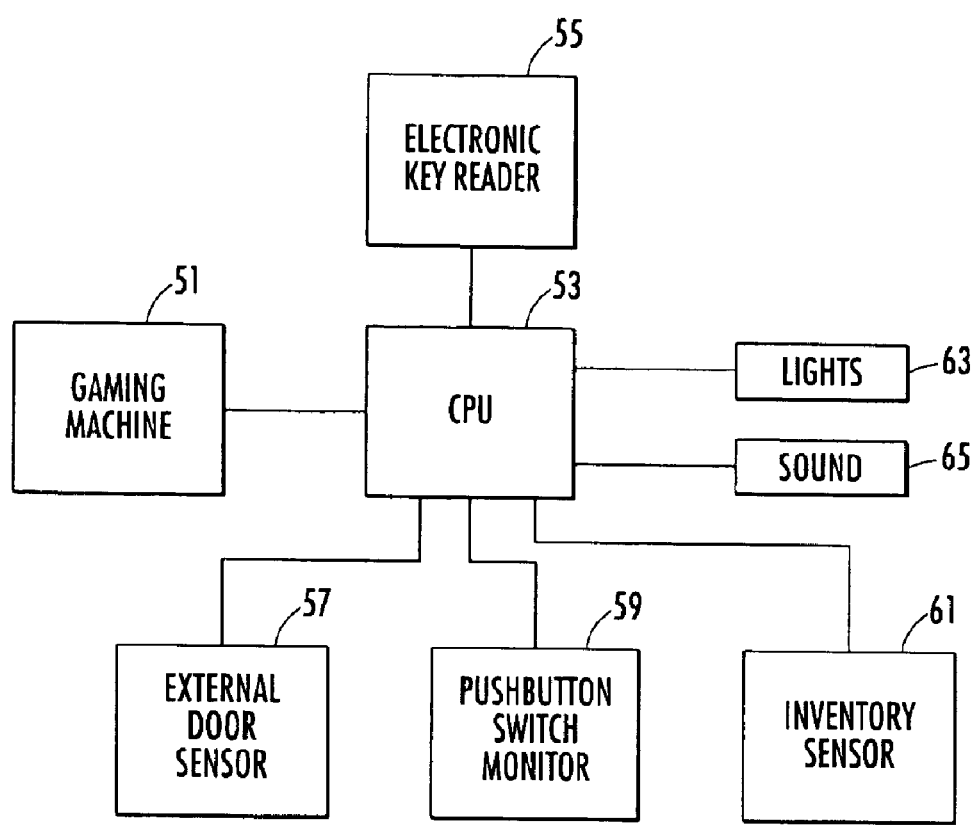
FIG. 6 is substantially a schematic diagram of the system of the present invention.

As seen in FIG. 6, vault 1 comprises central processor unit (CPU) 53, which is preferably a programmed computer or microprocessor, or its equivalent. The CPU is coupled to a conventional gaming device 35, which could be a slot machine, a video poker machine, or any other gaming machine capable of signaling, to the CPU, that a player has qualified to select a prize from vault 1.

In practice, gaming device 51 may be integrated into the same housing as vault 1, as shown in FIG. 5, or it may be physically separate and located some distance away. Alternatively, the vault may be connected to a plurality of gaming devices 35 through a communication network. In this way, the vault can dispense prizes for a plurality of devices. The communication network may be any of a number of network systems that are well known in the art. In this embodiment, each gaming device 35 would send a signal to the vault when a player had qualified to win a prize in vault 1. Vault 1 may also be connected to a central computer that may monitor the vault and provide additional security. The central computer may verify when a player has won a prize in vault 1 and the central computer may enable locks in the vault to allow an attendant to remove prizes from the vault.

Various peripheral components are connected to CPU 53, such that the CPU can monitor their status. These include lock 11, door sensor 57, input device 13, and inventory sensors 61.

CPU 53 is preferably programmed to enable a lock to open only when an appropriate signal is received from a gaming device, and when the corresponding input device 13 is activated. It can also be programmed to prevent any lock from opening if an incorrect input device is pressed, or if more than one input device is pressed.

The inventory sensor 61 is a device for monitoring the contents of the compartments. As noted above, the inventory sensor could be a simple switch or microswitch that is actuated when a box is in a compartment, and not actuated when a box is not present. It could instead be a non-contacting proximity sensor, such as a capacitive sensor, capable of determining the presence or absence of an object in the compartment. More preferably, the inventory sensor is an RFID system, which requires that a tag be affixed to each award, the tag having circuitry capable of transmitting an encoded reply in response to an interrogation signal. The type of sensor used does not limit the invention.

CPU 53 is also connected to light display generator 63 and audio generator 65. The light display generator 63 comprises circuitry for controlling the lights on the periphery of the gaming device and/or on the periphery of vault 1, and/or the lights on top of vault 1. The audio generator 65 controls the playing of a musical tune, preferably a happy tune, which accompanies the winning of a prize by a player. Both the light display and the audio generator serve to enhance the entertainment value of the device, by announcing a player's good luck in winning a major award, and by broadcasting this event to other customers in the vicinity of the device. The light display and audio generator also assist attendants in locating the machine that is the site of the winning play. Both, either, or neither of the light display and audio generator could be used, within the scope of the invention.

CPU 53 may also be in communication with display device 7. CPU 53 is preferably adapted to cause display device 7 to display a variety of appropriate presentations, such as instructions to the player to select an input device when the player has qualified to receive a prize from vault 1. Display device 7 may also be a touch screen that is adapted to serve both as a display device and an input device.

Method of Operation

A general description of the method of use of the present invention is as follows. First, the player qualifies to receive a prize from vault 1. This may occur when the player obtains a predetermined event on a gaming device. In the preferred embodiment, the prize is a special prize, i.e. one that is awarded comparatively rarely. However, the invention is not necessarily limited to use with special prizes.

When the player has qualified to receive a prize from vault 1, the vault so notifies the player. Such notification may include the playing of a "happy" tune on an audio system connected to, or forming part of vault 1 and/or the flashing of lights in an unusual pattern. If the gaming machine includes a light 29 or other attendant alarm, the alarm can be activated to summon an attendant who may be needed to help the player retrieve the prize.

The player then must choose a prize from one of the compartments. The player may indicate this choice by pressing one of the input devices 13. The player may be required to indicate a choice even if the compartments all contain the same award. But whether or not the prizes are the same or different, the device will work in essentially the same way.

In the preferred embodiment, selecting a prize may be a necessary, but not sufficient, condition to open the compartment associated with that input device. Additional steps, described below, may be performed before the contents of the selected compartment can be retrieved. Also, in the preferred embodiment, for reasons of security, when a given input device is pressed, CPU 53 automatically disables the other input devices, so that it is not possible to open any compartment other than the one selected by the player.

Meanwhile, in the preferred embodiment, an attendant arrives, summoned by the sights and/or sounds of a winning machine. The attendant may carry both a master key that can unlock lock 17 on external door 15 and an electronic key 19. Electronic key 19 is programmed to open a given compartment when an appropriate code, associated with the selected compartment, is entered into electronic key 19. The attendant connects electronic key 19 to lock 11 associated with compartment 9 selected by the player, and enters a code on a keypad on the electronic key. A specific code may have been previously assigned to each compartment, and the attendant must enter the correct code pertaining to the compartment selected by the player.

If the code entered by the attendant is correct, lock 11 opens (locking plate 10 retracts), and the contents of compartment 9 can be removed. At this point, the attendant can lock compartment 9, leaving it empty until another award can be placed therein. Alternatively, the attendant can immediately refill the compartment 9, and then lock it. It may also be possible to leave the compartment empty temporarily, and not to lock the compartment.

The electronic lock described above is commercially available. For example, one could use an electronic lock sold by Medeco, of Salem, Va., under the trademark INSITE VLS, the latter product being covered by U.S. Pat. No. 5,140,317, the disclosure of which is hereby incorporated by reference. Other products may also be used.

It is recognized that vault 1 may be provided without many of the security features discussed above. For example, vault 1 may be configured so that the selected prize is automatically given to the player. In this embodiment, no attendant is needed to open door 15 of vault 1. Door 15 may automatically open and close and the appropriate prize may be ejected from the appropriate compartment 9.

Figure 8:
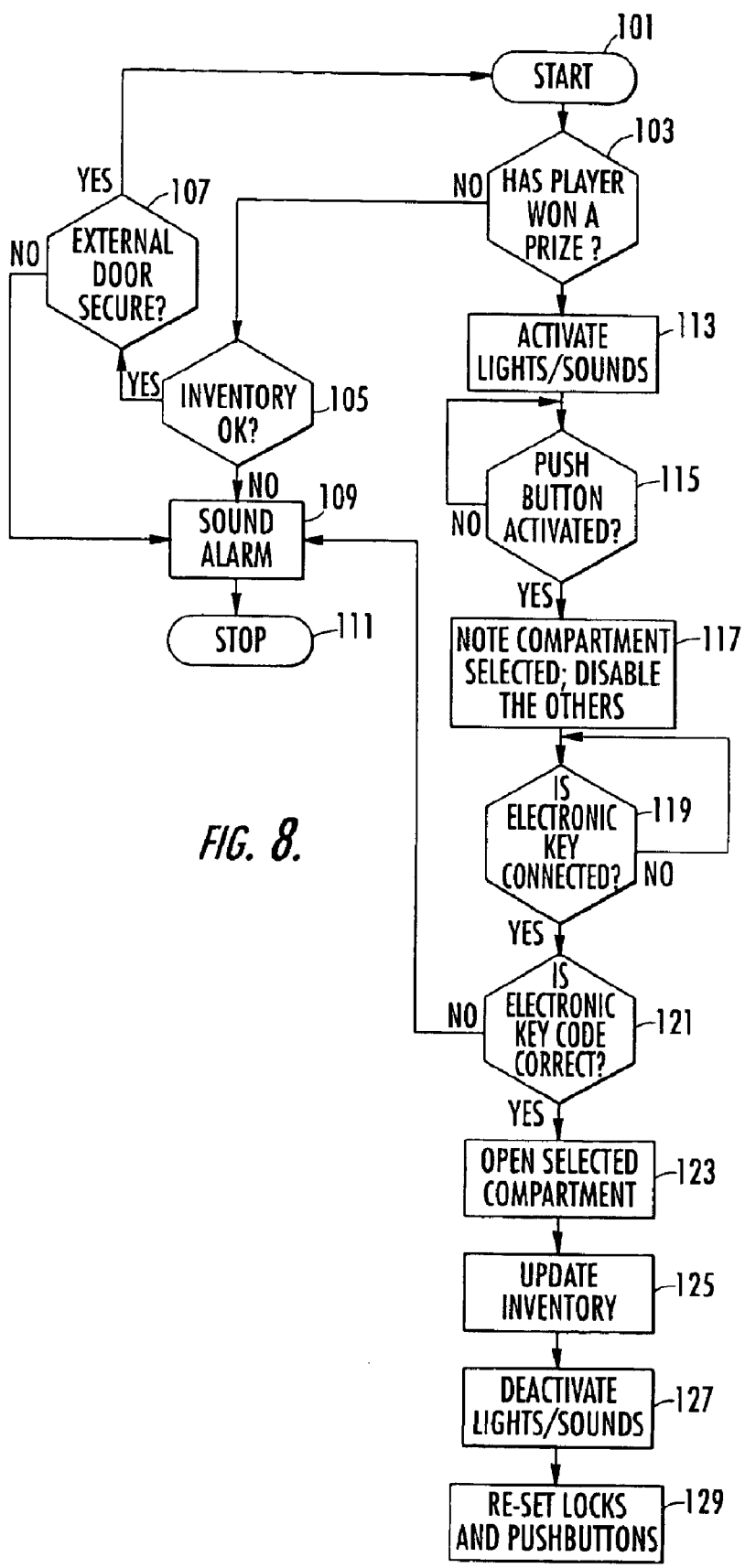
FIG. 8 is substantially a flow chart illustrating the major steps of the method of the present invention.

FIG. 8 is substantially a flow chart illustrating the major steps in the operation of CPU 53 according to one embodiment of the present invention. This method of operation may be implemented as a software program installed in CPU 53. The program begins in block 101. The program then determines whether a player has won a game that would entitle him or her to select a prize displayed in the vault. Normally, the answer would be no. In this case, CPU 53 would proceed to test 105, which checks the status of the inventory sensor. If the condition of the inventory is normal, CPU 53 proceeds to test 107, which checks the condition of door 15. If either of these tests indicates an abnormal condition, CPU 53 sounds an alarm, in block 109, and stops, in block 111, thereby disabling vault 1.

For the vast majority of iterations, the player will not have won a game, and there will be no abnormal condition. The program will therefore execute the loop described above, until one of the above conditions changes.

Assume now that the player has won the right to select a prize held in vault 1. CPU 53 activates the lights and/or sounds associated with the winning of the game, in block 113. CPU 53 then waits for an input device to be pressed, in test 115.

Next, in test 119, CPU 53 waits for input from an electronic key 19, which is to be connected to lock 11 associated with the selected compartment. If electronic key 19 is not connected to the correct compartment, or if the code entered into the key is not correct, PU 53 will sound an alarm and stop, according to test 121. CPU 53, in block 117, enables compartment lock and deactivates the input device. If the electronic key is connected correctly, and the entered code is also correct, CPU 53 opens lock 11 associated with the selected compartment, in block 123. In block 125, CPU 53 updates its inventory records, according to the prize that is removed. It is also possible that the attendant may replace the inventory at this point, in which case block 125 also includes updating the inventory to reflect the prize placed in the vault. CPU 53 then deactivates the lights and/or sounds, in block 127, and resets the lock and input device signals, so that it is ready to detect future activation of these. The program then returns to block 101.

Alternative path 116 is provided for a simplified embodiment in which the selected prize is automatically dispensed. This embodiment, discussed more fully below, utilizes fewer security features.

The present invention also comprises a method for awarding time sensitive prizes. The value of some prizes is dependent on time. For example, tickets to a boxing match have no value after the boxing match has occurred. To avoid having this kind of prize sit in the vault until they are worthless, the vault or the associated gaming machine would increase the probability of winning the prize the closer the time is to a critical date. For example, the probability of winning boxing tickets may be 0.001 a month before the event while the probability of winning the boxing tickets may be adjusted to 0.01 one day before the event and further adjusted the day of the event to a probability of 1. It is well within the ability of game designers to program gaming machines to use different probabilities depending on the date.

There are many ways to vary the program illustrated in FIG. 8 and described above. Various security tests could be performed almost simultaneously, and repeatedly, at different points in the logical flow of the program. For example, one could check the integrity of the external door and of the inventory, at different locations in the program. The arrangement of FIG. 8 comprises only one example, and is not intended to limit the invention to a particular method.

In the examples given above, the operation of the external door lock is independent of the operation of the gaming device and the vault. The attendant simply uses a conventional key to open the door, to allow access to the compartments when they are opened. However, it is also possible to control the external door lock according to the status of the gaming device. That is, CPU 53 could include means for preventing the external lock from opening unless the player wins a game resulting in one of the prizes displayed in the vault. In the latter case, the program would need to test for the status of the external lock in the steps, which are executed following a "YES" answer in test 103. It is also possible to make the external lock an electronic lock.

Prize Monitoring

The present invention also includes a method and apparatus for monitoring and tracking prizes and control inventory. To perform this function, it is necessary to provide the apparatus with a means for determining at least the presence or absence of an object in a compartment. Such means could be as simple as a microswitch that is actuated only when a prize is present, the microswitch being connected to appropriate circuitry for determining the condition (open or closed) of the switch. Alternatively, one could use a proximity sensor, such as a non-contacting capacitive sensor, which is available from Stedham Electronics Corp., of Reno, Nev. Yet another alternative includes optical devices, such as bar code labels or tags attached to the prizes and one or more bar code scanners positioned in or near vault 1 to read the bar codes.

In a more preferable alternative, a radio frequency identification (RFID) system may be used. In this system, a tag attached to the prize includes circuitry comprising a radio frequency transmitter. This tag is preferably included within the sealed prize container. An RFID tag reader, comprising a transceiver, or a separate transmitter and receiver, is provided in or near each compartment 9. The tag reader unit sends an RF signal that interrogates the tag. The transmitter on the tag responds with an encoded signal in reply. This encoded signal is then decoded by the receiver portion of the reader unit. The encoded signal transmitted by the tag can include information relating to the nature of the object, and is intended to include information, which is unique to the object to which the tag is affixed.

The advantage of an RFID system is that not only can the system detect the presence or absence of an object in a compartment, but it can also determine other information about the object, based on information encoded in the tag and transmitted to the reader. Information about a prize may be encoded in other forms such as a machine readable bar code.

In the preferred embodiment, a combination RFID and bar code system is used to monitor and track the prizes. In this embodiment, the bar code contains a unique identifier to identify the prize. The bar code may or may not be different from the unique identifier provided by the RFID. The bar code may be part of a tamper evident security label that seals the prize container which when broken indicates that the prize container has been opened. The inventory database may use both unique identifiers for inventory validation purposes.

Thus, using the inventory control means discussed above, the system can keep track of how many prizes are still in inventory, how many are located in the compartments, and how many have been won and distributed to players. The RFID system is especially useful in cases where different prizes are displayed in the various compartments, because the system can know exactly what kind of award is located in any particular compartment. The inventory control system therefore comprises not only a means for monitoring inventory, but also as a means for enhancing security, as it can be programmed to provide early warning if a prize is improperly removed from a compartment.

One embodiment of the present invention utilizes at least one unique inventory identifier. The identifier is associated with a particular award and it is used to track and monitor the prize. When a game operator first purchases a prize or the prize becomes associated with the system, the prize may be assigned the unique identifier. The identifier would preferably be stored or registered in a database that is maintained on a central computer or within the gaming device when the prize is sealed in a prize container. Every transaction involving the prize may then be recorded in the database. For example, a transaction may be recorded when a prize is taken out of storage and placed in vault 1 or when the prize is given to a player. The RFID system described above may be adapted to identify each award by its unique identifier. The gaming establishment and other entities may have access to the inventory database. Information from the database may be used to plan the manufacturing of inventory and marketing activities.

Figure 7:
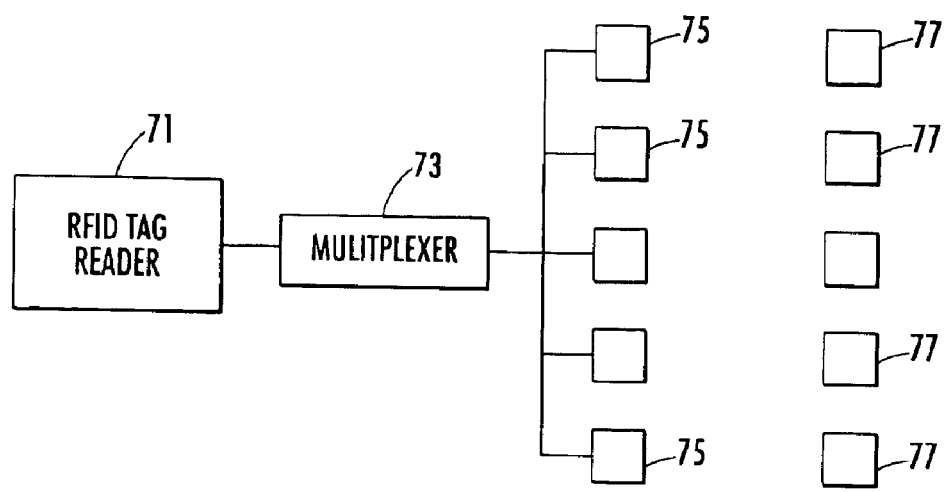
FIG. 7 is substantially a schematic diagram showing the preferred form of a radio frequency identification (RFID) system that may be used in the present invention.

FIG. 7 is substantially a schematic diagram of one embodiment of the inventory sensors shown in FIG. 6. RFID tag reader 71 includes a transmitter that sends an interrogation signal to the RFID tags, and a receiver which receives signals sent in reply by the various tags. The transmitter and receiver portions of reader 71 may be included in the same unit, and in fact may be provided on the same electronic chip. Multiplexer 73 performs a time-division of the transmitted signal, such that the signal will be transmitted by only one of the various antennas 75 at one time, each antenna being associated with one of the RFID tags. RFID tags 77 are positioned to receive from, and transmit to, the respective antennas 75. Multiplexer 73 enables one tag reader 75 to be used for the entire system, even though there are a plurality of RFID tags. Appropriate circuitry in multiplexer 73 decodes the received signal, so that the tag reader will know which tag transmitted a particular reply, based on the time at which that reply was received. Such multiplexing technology is within the level of ordinary skill of persons skilled in the electronic arts.

In the preferred embodiment, the vault is in communication with a central computer. The central computer holds a database of attendants authorized to open the vault for the purposes of awarding prizes or restocking prizes. A transaction record may be stored in a central computer each time a vault is accessed or a prize is awarded or restocked. In the latter case, the database in the central computer may only allow an attendant to open the vault during specific times.

Alternative Configurations

Figure 9:
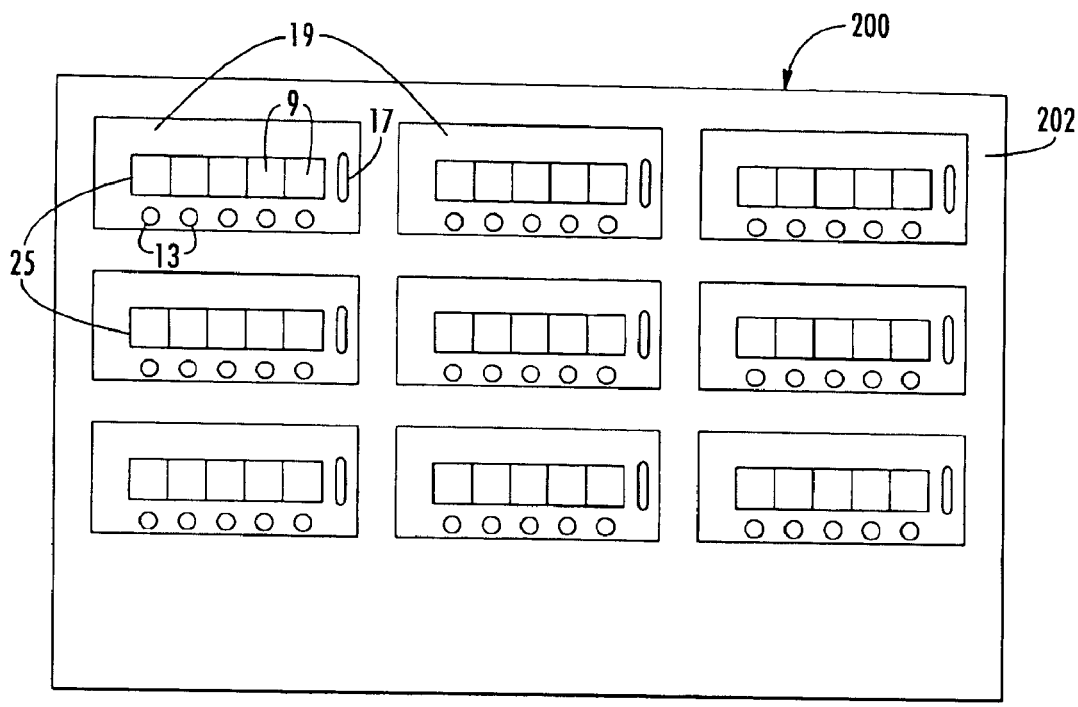
FIG. 9 is substantially a front view of an alternate embodiment of the dispensing device of the present invention.

Turning now to FIG. 9, the present invention includes a vault 200. Vault 200 comprises a housing 202 that may be made from a variety of suitable materials, such as steel and glass. Similar to the embodiment discussed above, a plurality of compartments 9 are provided in housing 202 for holding a plurality of prizes and openings are provided in the compartments for allowing the prizes to be removed. However, unlike the embodiment discussed above, vault 200 comprises a plurality of doors 15, which are attached to the housing, for covering the openings in the individual compartments. Alternatively, vault 200 may be provided with one single door providing access to all compartments 9. Each door 15 may be provided with a window for allowing players to view prizes in the compartments 9 and a lock 17 may be attached to each door, housing 202, or both for limiting the operation of the doors. Input devices 13 may also be provided for allowing players to select an award to be dispensed from vault 200. FIG. 9 shows input device 13 attached to doors 25. However, input devices 13 may be separate from vault 200 and a communication device, such as an electrical wire, may used to transmit the selection information to the vault.

Vault 200 may be operated in much the same way that vault 1 is operated, discussed above. This embodiment may be used to store and display a larger number of prizes than the embodiment discussed above. As will be discussed below, a larger number of prizes may be needed if a single vault is used to service a plurality of gaming devices. This embodiment also provides the advantage of centralizing the distribution of prizes, thereby reducing the cost equipment, maintenance, and support.

Figure 10:
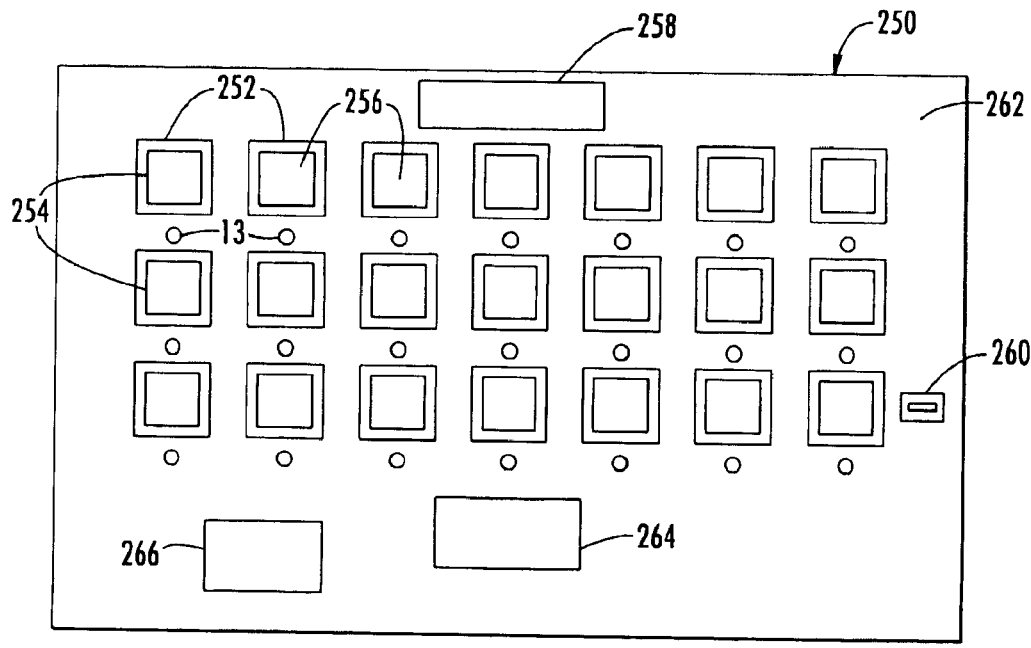
FIG. 10 is substantially a front view of another embodiment of the dispensing device of the present invention.

As seen in FIG. 10, the present invention also includes vault 250. Vault 250 comprises a housing 262 with a plurality of compartments 256 located in the housing. In this embodiment, a door 252 is provided for each compartment 256. Each door 252 may comprise a window 254 for allowing players to view prizes located in the compartments 256. Input devices 13 are provided for allowing players to select prizes.

Vault 250 also comprises a reader 260 that is adapted to read information on a voucher, coupon, ticket, magnetic card, or other information carrying device. Display 258, such as a video screen, and speakers 266 may be provided for presenting information to players.

Figure 13:
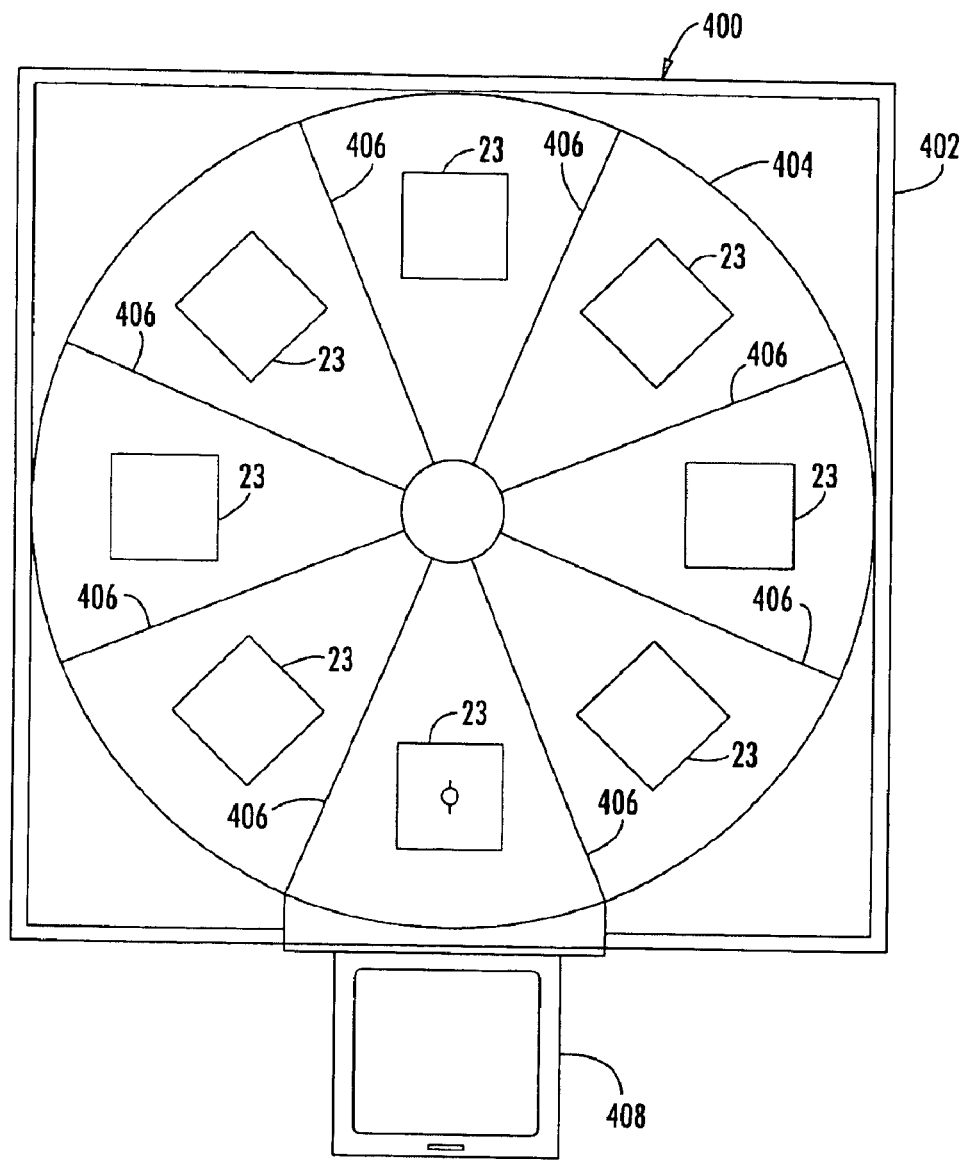
FIG. 13 is a top plan view of another embodiment of the dispensing device of the present invention.

FIG. 13 depicts another embodiment of the dispensing device of the present invention. In this embodiment, vault 400 comprises a housing 402 that preferably comprises transparent material, such as glass, that allows players to see inside of the housing. At least one tray 404 is provided inside of housing 402. Tray 404 is pivotally mounted so that it can rotate around a vertical axis. Partitions 406 may be provided to divide tray 404 into segments for holding different prizes. A container 23, holding a prize, may be placed in each compartment formed by partitions 406. A door 408, shown in an open position, may be provided for inserting and removing containers 23. The various locks, input devices, lights, etc., of the previous embodiments may be incorporated into vault 400.

Figure 14:
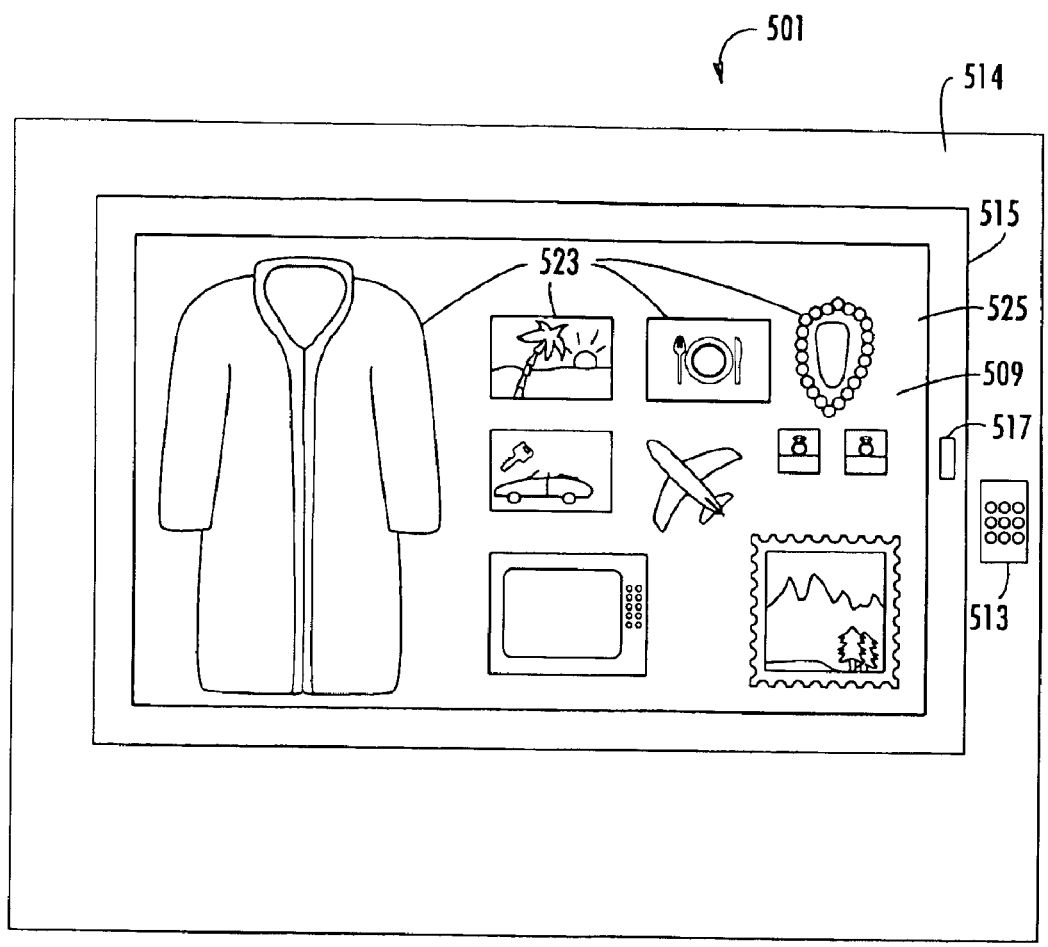
FIG. 14 is a front view of another embodiment of the dispensing device of the present invention.

Turning to FIG. 14, the present invention also includes an embodiment in which a plurality of prizes are kept in a single compartment. In this embodiment, vault 501 comprises a housing 514, compartment 509, and door 515. Door 515 comprises locking mechanism 517, which may be any of the locking devices above, and window 525. Rather than providing a compartment for each prize, this embodiment allows for a plurality of prizes 523 to be displayed in a single compartment 509. The prizes may be clothing, travel services, automobiles, electronic equipment, dining services, jewelry, toys, artwork, and many other kinds of goods and services. Compartment 509 is preferably designed to accommodate the number and size of prizes 523. This embodiment has the advantage of concentrating prizes together, which creates the feeling of a treasure trove.

This embodiment may utilize any of the security features discussed above. For example, an RFID tag may be attached to each prize 523 and one or more RFID sensors may be provided in vault 501 or bar codes may be attached to each prize and a bar code scanner may be positioned in the vault.

When a prize qualifying event occurs, the player would go to vault 501 and select a prize. The player may indicate the selection using an input device 513. Alternatively, the player may simply tell an attendant which prize he or she has selected. The attendant may then be given a voucher, either automatically or manually, and the player would redeem the voucher at another location, such as a redemption booth or the attendant may open door 515 and hand the displayed prize to the player. The attendant may also follow various security procedures, such as recording the prize transaction.

Automatic Dispensing

Figure 12:
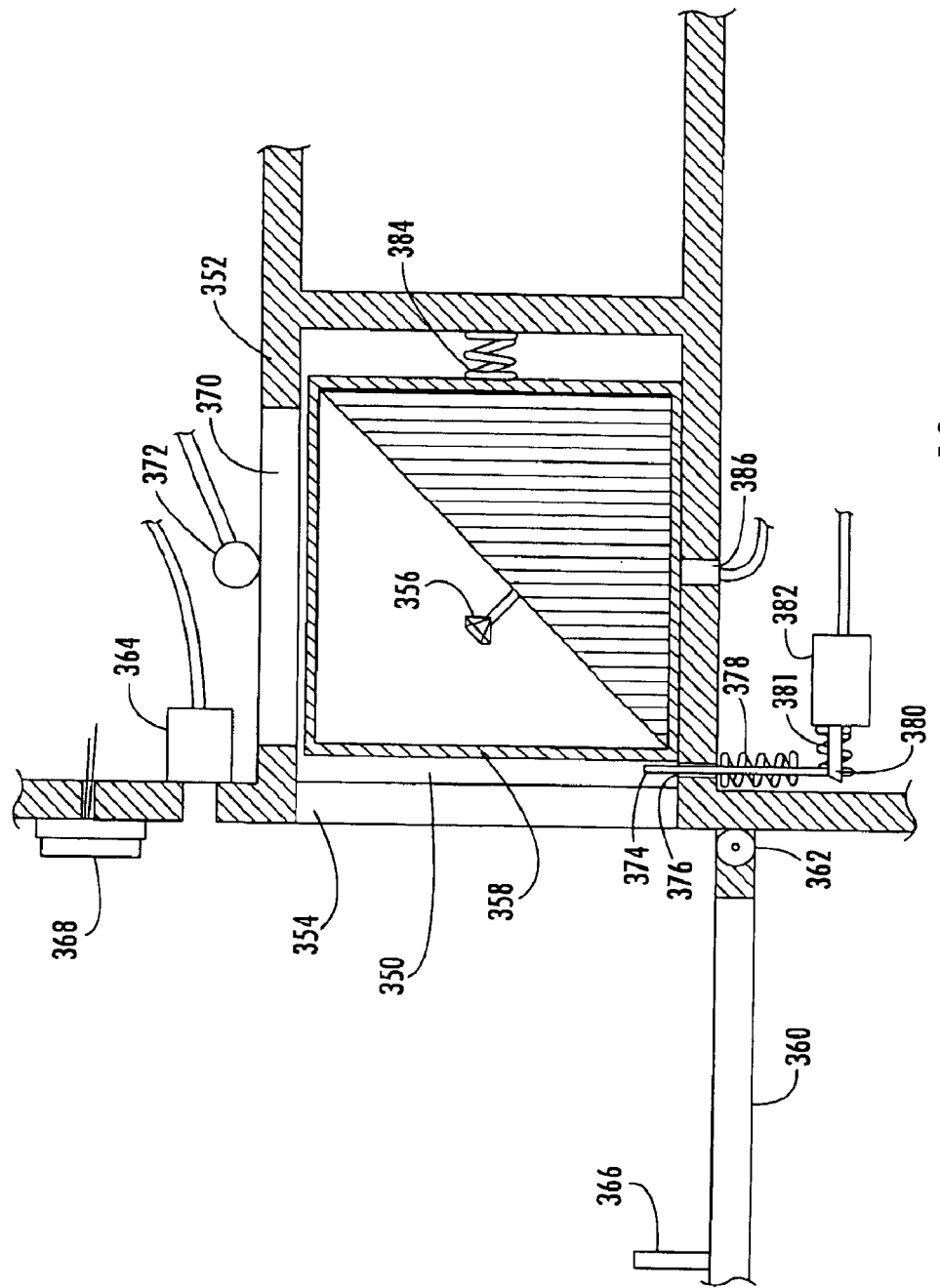
FIG. 12 is substantially a partial cross-sectional view of one embodiment of an automatic dispensing mechanism of the present invention.

The present invention also includes a dispensing mechanism that can automatically dispense the prize to the player. This and other dispensing mechanisms can be incorporated into all of the various embodiments of the vault. An example of one possible dispensing mechanism is illustrated in FIG. 12. Dispensing mechanisms are well known, and many mechanisms, such as vending machine mechanisms, may be adapted for use in the present invention. If a dispensing mechanism is used, vault 250 may have the advantage of not requiring the involvement of an attendant.

One example of an automatic dispensing mechanism is shown in FIG. 12. In this embodiment, compartment 350 is defined by a wall 352. Compartment 350 is adapted to hold a prize 356 in a container 358. Opening 354 is provided in wall 352 and it is adapted to allow container 358 to pass through the opening. Wall 352 may also comprise hole 370 to allow light 372 to illuminate prize 356. An inventory sensor 386 may be provided in or near wall 352 for monitoring the presence of prize 356.

Door 360, shown in an open position, may be provided to cover opening 354. Door 360 may be attached to the vault by a hinge 362. A pin 366 that is adapted to engage lock 364 may be attached to door 360. Lock 364 is in communication with a controller or computer (not shown) that causes the lock to allow door 360 to open. Hinge 362 may be spring loaded to allow door 360 to spring open when lock 364 is opened. Button device 368 may be provided for allowing a player to select prize 356 in compartment 350.

Additional security devices may also be incorporated into or associated with compartment 350. For example, pin 374 may be provided for preventing container 358 from being removed. In its activated position, pin 374 projects upward through hole 376. Spring 378 is provided to bias pin 374 in a downward direction and solenoid 382 with shaft 380, biased outward by spring 381, is provided to force pin 374 upward. It is recognized that many different lock mechanisms and security devices may be used with this embodiment of the present invention.

In normal operation, a player would select prize 356 by pressing button 368 or activating some other selection indicating device. The controller would then activate lock 364 which would allow pin 366 to disengage the lock 364. Door 360 would then be caused to open exposing container 358 through opening 354. The controller would then activate solenoid 382, which would then cause shaft 380 to move away from pin 374. Spring 378 would then cause pin 374 to descend into to hole 376, thereby allowing container 358 to move through opening 354. A spring 384 may be provided for pushing container 358 at least partially through opening 354. Other latching, locking, pushing, or moving devices may also be used.

The present invention may also include an automatic replenishment mechanism (not shown). Such a mechanism would restock the compartment 350 with a prize after a prize has been dispensed. The replenishment mechanism may comprise a conveyor system that would position a prize in compartment 350 from the rear of the compartment.

Networked System

Figure 11:
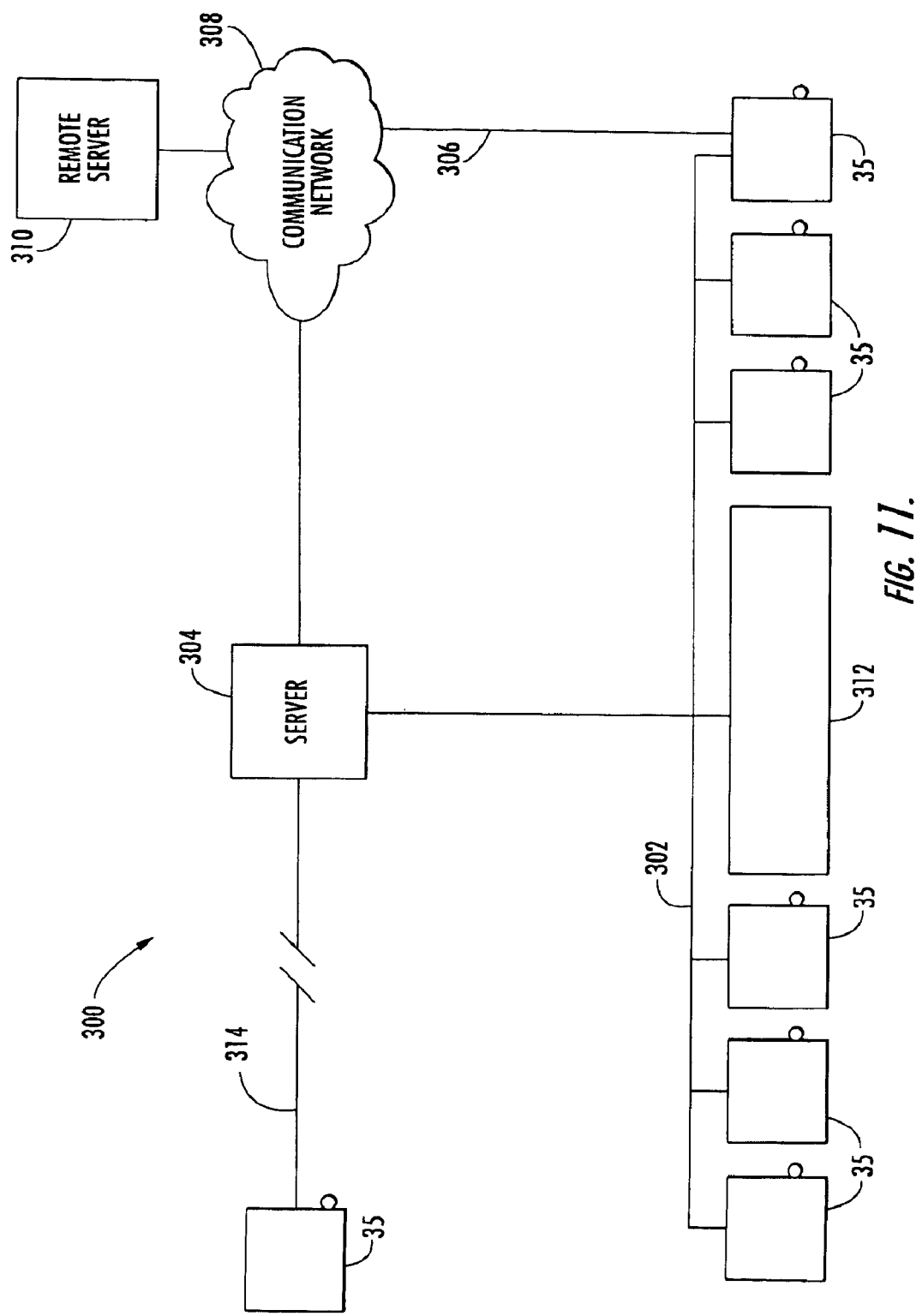
FIG. 11 is substantially a schematic diagram of a system of the present invention.

FIG. 11 illustrates a system 300 of the present invention in which a vault 312 is used to service a plurality of gaming devices 35. Vault 312 may be any of the vaults discussed above or a combination of the vaults discussed above. A communication device 302 may be provided for allowing vault 312 to communicate with gaming devices 35. Many different communication devices are well known in the art that could be adapted for use the present invention. One example of a communication device is an Ethernet local area network with appropriate software and network cards installed in vault 312 and gaming devices 35.

System 300 may comprise a central computer 304 that may be used to manage the system. For example, central computer 304 may track player activity, monitor the status of prizes in vault 312, monitor inventory, authorize access of attendants and players, authorize the dispensing of prizes, and communicate with other devices.

Vault 312 is preferably positioned so that it receives maximum exposure to players. As players walk by vault 312 they can see prizes being displayed there and preferably they can see the prizes when they are playing.

In normal operation, when a player obtains a predetermined winning event on one gaming device 35, the player may wait for an attendant to arrive. The attendant would then verify that the player has qualified for a prize. The player and the attendant would then walk to vault 312 where the player would select the prize and the attendant would open the appropriate door and remove the selected award. Alternatively, vault 312 may have an automatic dispensing mechanism, discussed above, that would dispense the prize to the player.

In another embodiment, the player would be issued an information carrying device, such as a voucher, coupon, ticket, or magnetic card, and the player would take this device to vault 312. Vault 312 would have a reader that would read the information on the information carrying device. Vault 312 may then verify the information with central computer 304 or one of the gaming devices 35. After it had received verification, if necessary, vault 312 would allow the player to select a prize and dispense the prize to the player. Some prizes may require more than one prize qualifying event to be redeemed. For example, a player may be required to accumulate two or more bonus awards to qualify to receive a prize from vault 312. A system described in U.S. patent application entitled Apparatus and Method for Maintaining Game State, filed on Dec. 20, 2000, which is incorporated herein by reference, may be used to redeem prizes using multiple prize winning events.

In one embodiment of the present invention, central computer 304 is in communication over a communication network 308 with a remote server 310. Remote server 310 maintains a database of prizes that are available for the player to receive. A display device, such as a video screen, may be provided on each gaming device and/or on vault 12 for displaying the prizes available for selection. An input device may also be provided for selecting prizes and navigating through various menus. Once a player has qualified for a prize, the player would be presented with one or more prizes that the player could receive. The prizes may be categorized into different award levels that correspond with the different award levels in the underlying game. The player would then select a prize. The prize may be given to the player at vault 312, at another establishment, such as a store, or it may be delivered to the player.

The present invention may be adapted for use with player tracking systems wherein the prizes to be awarded to a player are associated with the player and not a particular device. For example, when a player has qualified to win a prize, a record of the qualification is recorded in a centralized database. The qualification is associated with the identity of the player, which may be implemented with a player number. The player may then go to any vault that is in communication with the system to select and receive a prize.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A system for awarding prizes, the system comprising:
   (A) at least one gaming device, the gaming device being adapted to allow a player to play a game and produce a predetermined prize qualifying event;
   (B) a plurality of prizes; and
   (C) at least one vault, the vault comprising:
      (a) a housing;
      (b) at least one compartment within the housing, wherein a plurality of prizes are located in the compartment, at least one of the prizes being removable directly from the compartment;
      (c) an outer door attached to the housing, the door limiting access to the compartment when in a closed position;
      (d) an outer door lock positioned on the outer door and configured to selectively secure the outer door in a closed position; and
      (e) an inner locking mechanism in close relative proximity to the compartment, the inner locking mechanism adapted to limit removal of a prize from the compartment; wherein the player may view the prizes the player may receive when a prize qualifying event occurs.

2. The system of claim 1 further comprising;
   (a) a plurality of inventory tags, each tag attached to a prize, each tag comprising a unique identifier;
   (b) at least one inventory sensor located within the housing and in relatively close proximity to the compartment, the inventory sensor being adapted to transmit a signal to a computer, the signal indicating the presence or absence of the prize;
   (c) a computer in communication with the inventory sensor and adapted to receive signals from the inventory sensor, wherein the computer is adapted to record information related to the prize.

3. The system of claim 1 further comprising a video screen located in the housing, the video screen adapted to display information relating to the prize.

4. The system of claim 1 further comprising a container positioned within the compartment and directly removable from the compartment, wherein the prizes are removably positioned inside the container.

5. The system of claim 1 wherein the prize qualifying event comprises a substantially randomly occurring predetermined prize qualifying event.

6. The system of claim 5 wherein the gaming device is a slot machine.

7. A system for awarding prizes, the system comprising:
   (A) at least one gaming device, the gaming device being adapted to allow a player to play a game and to produce a predetermined prize qualifying event;
   (B) a plurality of prizes; and (C) at least one vault, the vault comprising:
  (a) a housing;
  (b) a plurality of compartments in the housing, each compartment being adapted to hold at least one of the plurality of prizes, the plurality of prizes being directly removable from the compartments, each compartment having a window enabling the contents of the compartment to be seen from outside the vault;
  (c) a plurality of external doors attached to the housing, the doors limiting access to the plurality of compartments when in a closed position;
  (d) a plurality of external door locks, each lock coupled to one of the external doors, the external door locks selectively securing the outer doors in a closed position; and
  (e) a plurality of internal locks located within the housing and each internal lock in close relative proximity to a compartment, the internal locks being adapted to limit removal of the prizes from the compartments; wherein the player may view the prize the player may receive when the prize qualifying event occurs.

8. The system of claim 7 further comprising;
  (a) a plurality of inventory tags, each tag attached to a prize, each tag comprising a unique identifier;
  (b) at least one inventory sensor located within the housing and in relatively close proximity to one of the compartments, the inventory sensor being adapted to transmit a signal to a computer, the signal indicating the presence or absence of a prize;
  (c) a computer in communication with the inventory sensor and adapted to receive signals from the inventory sensor, wherein the computer is adapted to record information related to a prize.

9. The system of claim 7 further comprising a video screen within the housing, the video screen adapted to display information relating to a prize.

10. The system of claim 7 further comprising a container positioned within a compartment and directly removable from the compartment, wherein at least one prize is removably positioned inside the container.

11. The system of claim 7 wherein the prize qualifying event comprises a substantially randomly occurring predetermined prize qualifying event.

12. The system of claim 11 wherein the gaming device is a slot machine.

13. A system for awarding prizes, the system comprising:
  (A) at least one gaming device, the gaming device being adapted to allow a player to play a game and produce a predetermined prize qualifying event;
  (B) a plurality of prizes; and
  (C) at least one vault, the vault comprising:
    (a) a housing;
    (b) a plurality of compartments located in the housing, each compartment being adapted to hold at least one of the plurality of prizes, the plurality of prizes being positioned in the compartments and being directly removable from the compartments, each compartment having a window enabling contents of the compartment to be seen from outside the vault;
    (c) a plurality of external doors attached to the housing, each external door limiting access to one of the plurality of compartments when in a closed position;
    (d) a plurality of external door locks coupled to the external doors and configured to selectively secure the external doors in a closed position; and
    (e) a plurality of prize locks located within the housing, the prize locks being adapted to limit removal of the prizes from the compartments; wherein the player may view the prizes the player may receive when the prize qualifying event occurs.

14. The system of claim 13 further comprising;
  (a) a plurality of inventory tags, each tag attached to a prize, each tag comprising a unique identifier;
  (b) at least one inventory sensor located within the housing and in relatively close proximity to one of the compartments, the inventory sensor being adapted to transmit a signal to a computer, the signal indicating the presence or absence of a prize;
  (c) a computer in communication with the inventory sensor and adapted to receive signals from the inventory sensor, wherein the computer is adapted to record information related to the prize.

15. The system of claim 13 further comprising a container removably positioned within the compartment, wherein at least one prize is removably positioned inside the container.

16. The system of claim 13 further comprising a video screen, the video screen adapted to display information relating to the prize.

17. The system of claim 13 wherein the prize qualifying event comprises a substantially randomly occurring predetermined prize qualifying event.

18. The system of claim 17 wherein the gamming device is a slot machine.

19. A system for awarding prizes, the system comprising:
  (A) at least one gaming device, the gaming device being adapted to allow a player to play a game and produce a predetermined prize qualifying event;
  (B) at least one prize; and
  (C) at least one vault, the vault comprising:
    (a) a housing;
    (b) a compartment located within the housing, the compartment being adapted to hold the prize, the prize being positioned in the compartment and directly removable from the compartment; and
    (c) an automatic dispenser located in the housing in close relative proximity to the compartment; the automatic dispenser configured to move the prize into position for retrieval by the game player when a prize winning event occurs.

20. The system of claim 19 further comprising;
  (a) at least one inventory tag, the inventory tag attached to the prize, the tag comprising a unique identifier;
  (b) at least one inventory sensor located within the housing and in relatively close proximity to the compartment, the inventory sensor being adapted to transmit a signal to a computer, the signal indicating the presence or absence of a prize;
  (c) a computer in communication with the inventory sensor and adapted to receive signals from the inventory sensor, wherein the computer is adapted to record information related to the prize.

21. The system of claim 19 further comprising a container positioned within the compartment and directly removable from the compartment, wherein the prize is removably positioned inside the container.

22. The system of claim 19 further comprising a video screen, the video screen adapted to display information relating to the prize.

23. The system of claim 19 wherein the vault further comprises a replenishing system, wherein the replenishing system is configured to provide another prize to the compartment in the event that a prize is dispensed from the compartment.

24. The system of claim 19 wherein the automatic dispenser comprises:
   (a) a door attached to the housing and configured to limit access to the compartment when in a closed position;
   (b) a locking mechanism located in the compartment and configured to selectively secure the door in a closed position and configured to release when directed by a controller;
   (c) a controller, the controller in communication with the locking mechanism and adapted to send a signal to the locking mechanism, the signal directing the locking mechanism to release the door, allowing access to the prize.

25. The system of claim 19 wherein the automatic dispenser comprises:
   (a) a door attached to the housing and configured to limit access to the compartment when in a closed position;
   (b) a locking mechanism located in the compartment and configured to selectively secure the compartment door in a closed position and configured to be releasable when signaled by a controller;
   (c) a controller, the controller in communication with the locking mechanism and configured to send a signal to the locking mechanism making the locking mechanism releasable; and
   (d) an input device mounted on the housing and in communication with the controller or the locking mechanism and indicating a player's selection of a prize, wherein the input device is adapted to be activated by the player, activation of the input device directing the locking mechanism to release.

26. The system of claim 25 further comprising a plurality of compartments, a plurality of doors, and a plurality of locking mechanisms, and wherein the activation of an input device directs the controller to release the selected locking mechanism and to secure any other locking mechanisms.

27. The system of claim 25 wherein the locking mechanism comprises a pin on the compartment door that engages a lock in the housing, wherein the lock is configured to release the pin when directed by the controller.

28. The system of claim 25 wherein the door is attached to the housing by a hinge, and wherein the hinge is spring loaded, the spring loaded hinge configured to spring open when the locking mechanism is disengaged.

29. The system of claim 19, further comprising;
   (a) a prize container positioned within the compartment and directly removable from the compartment, wherein the prize container contains a prize;
   (b) a compartment locking mechanism associated with the compartment, the compartment locking mechanism adapted to selectively limit removal of the container from the compartment; and
   (c) a controller, the controller in communication with the compartment locking mechanism and configured to send a signal to the compartment locking mechanism causing the locking mechanism to disengage and allow the prize container to be removed.

30. The system of claim 29 wherein the compartment locking mechanism comprises:
   (a) a pin located in the housing and positionable between a first position and at least a second position, wherein in the first position the pin extends into the compartment and does not substantially extend into the compartment when in the second position;
   (b) a solenoid located in the housing and in communication with the pin, the solenoid adapted to actuate the pin between the first and second positions;
   (c) a spring located in the housing and in communication with the pin, the spring adapted to bias the pin; wherein the pin limits removal of the container when the pin is in the first position.

31. The system of claim 19 wherein the prize qualifying event comprises a substantially randomly occurring predetermined prize qualifying event.

32. The system of claim 31 wherein the gaming device is a slot machine.

33. A system for awarding prizes, the system comprising:
   (A) at least one gaming device, the gaming device being adapted to allow a player to play a game and produce a predetermined prize qualifying event;
   (B) a plurality of prizes; and
   (C) at least one vault, the vault comprising:
      (a) a housing;
      (b) a rotating tray located within the housing and rotating about a substantially vertical axis of rotation, the rotating tray comprising at least one prize located on the tray and directly removable from the tray;
      (c) a door coupled to the housing and limiting access to the rotating tray when in a closed position;
      (d) a door locking mechanism coupled to the door and configured to selectively secure the door in a closed position, the door locking mechanism being adapted to limit removal of the prize from the tray; wherein the player may view the prize the player may receive when the prize qualifying event occurs; and
      (e) a prize lock associated with the rotating tray, the prize lock being adapted to limit removal of the prize from the rotating tray.

34. The system of claim 33, wherein the rotating tray further comprises a plurality of partitions, the plurality of partitions defining a plurality of compartments, wherein at least one of the plurality of prizes may be located within each of the plurality of compartments and the prizes are directly removable from the compartments.

35. The system of claim 33 further comprising;
   (a) a plurality of inventory tags, each tag attached to a prize, each tag comprising a unique identifier,
   (b) at least one inventory sensor located within the housing and in relatively close proximity to one of the prizes, the inventory sensor being adapted to transmit a signal to a computer, the signal indicating the presence or absence of a prize;
   (c) a computer in communication with the inventory sensor and adapted to receive signals from the inventory sensor, wherein the computer is adapted to record information related to the prize.

36. The system of claim 33 further comprising a container positioned on the rotating tray and directly removable from the rotating tray, wherein a prize is removably positioned inside the container.

37. The system of claim 33 further comprising a video screen, the video screen adapted to display information relating to the prize.

38. The system of claim 33 wherein the prize qualifying event comprises a substantially randomly occurring predetermined prize qualifying event.

39. The system of claim 38 wherein the gaming device is a slot machine.

40. A system for awarding prizes, the system comprising:
   (A) at least one gaming device, the gaming device being adapted to allow a player to play a game and produce a predetermined prize qualifying event;

(B) a plurality of prizes; and (C) at least one vault, the vault not being in direct physical contact with the gaming device, the vault in communication with the gaming device, the vault comprising:

(a) a housing;

(b) a plurality of compartments in the housing, each compartment being adapted to hold at least one of the plurality of prizes, the plurality of prizes being directly removable from the compartments; and (c) a prize lock, the prize lock being adapted to limit removal of a prize from one of the compartments; wherein the player may view the prize the player may receive when the prize qualifying event occurs.

41. The system of claim 40 further comprising;

(a) a plurality of inventory tags, each tag attached to a prize, each tag comprising a unique identifier;

(b) at least one inventory sensor located within the housing and in relatively close proximity to one of the compartments, the inventory sensor being adapted to transmit a signal to a computer, the signal indicating the presence or absence of a prize;

(c) a computer in communication with the inventory sensor and adapted to receive signals from the inventory sensor, wherein the computer is adapted to record information related to the prize.

42. The system of claim 40 further comprising a container positioned within a compartment and directly removable from the compartment, wherein a prize is removably positioned inside the container.

43. The system of claim 40 further comprising a video screen, the video screen adapted to display information relating to the prizes.

44. The system of claim 40 further comprising a plurality of compartment doors attached to the housing, each compartment door configured to limit access to one of the plurality of compartments when in a closed position.

45. The system of claim 44 further comprising a plurality of compartment locking mechanisms coupled to the plurality of compartment doors, each compartment locking mechanism configured to selectively secure one of the compartment doors in a closed position.

46. The system of claim 40 wherein the prize qualifying event comprises a substantially randomly occurring predetermined prize qualifying event.

47. The system of claim 46 wherein the gaming device is a slot machine.

48. A system for awarding prizes, the system comprising:

(A) at least one gaming device, the gaming device being adapted to allow a player to play a game and produce a predetermined prize qualifying event;

(B) a plurality of prizes; and (C) at least one vault, the vault comprising:

(a) a housing;

(b) a plurality of compartments within the housing, each compartment being adapted to hold at least one of the plurality of prizes, the plurality of prizes being positioned in the compartments and directly removable from the compartments;

(c) a prize lock associated with at least one of the compartments, the prize lock being adapted to limit removal of the prize from at least one of the compartments; wherein the player may view the prize the player may receive when the prize qualifying event occurs;

(d) an award indicia reader located on the housing, the award indicia reader designed to accept an award indicia; and (e) a processor in communication with the award indicia reader, the processor configured to determine if a player is entitled to an award, the processor in communication with the lock, the processor configured to disable the prize lock if the player is entitled to an award.

49. The system of claim 48 further comprising;

(a) a plurality of inventory tags, each tag attached to a prize, each tag comprising a unique identifier;

(b) at least one inventory sensor located within the housing and in relatively close proximity to one of the compartments, the inventory sensor being adapted to transmit a signal to a computer, the signal indicating the presence or absence of a prize;

(c) a computer in communication with the inventory sensor and adapted to receive signals from the inventory sensor, wherein the computer is adapted to record information related to the prize.

50. The system of claim 48 further comprising a container positioned within a compartment and directly removable from the compartment, wherein a prize is removably positioned inside the container.

51. The system of claim 48 further comprising a video screen, the video screen adapted to display information relating to the prizes.

52. The system of claim 48 wherein the prize qualifying event comprises a substantially randomly occurring predetermined prize qualifying event.

53. The system of claim 52 wherein the gaming device is a slot machine.

* * * * *

UNITED STATES PATENT AND TRADEMARK OFFICE
CERTIFICATE OF CORRECTION

PATENT NO. : 6,899,626 B1
DATED : June 15, 2005
INVENTOR(S) : Robert A. Luciano, Jr., Robert W. Crowder and Michael Souza It is certified that error appears in the above-identified patent and that said Letters Patent is hereby corrected as shown below:

Column 5,
Line 33, replace the first occurrence of "the" with -- that --.

Column 8,
Line 25, replace "PU" with -- CPU --.

Column 11,
Line 4, after the word "may" insert -- be --.

Column 13,
Line 14, after the word "use" insert -- in --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,899,626 B1
DATED : June 15, 2005
INVENTOR(S) : Robert A. Luciano, Jr., Robert W. Crowder and Michael Souza It is certified that error appears in the above-identified patent and that said Letters Patent is hereby corrected as shown below:

Column 5,
Line 33, replace the first occurrence of "the" with -- that --.

Column 8,
Line 25, replace "PU" with -- CPU --.

Column 11,
Line 4, after the word "may" insert -- be --.

Column 13,
Line 4, after the word "use" insert -- in --.

This certificate supersedes Certificate of Correction issued August 23, 2005.

Signed and Sealed this

Eighth Day of November, 2005

JON W. DUDAS
*Director of the United States Patent and Trademark Office*